United States Patent [19]

Ali

[11] Patent Number: 4,645,179
[45] Date of Patent: Feb. 24, 1987

[54] GATE VALVE SEAL SYSTEM

[75] Inventor: Syed Z. Ali, Gretna, La.

[73] Assignee: Baker CAC, Belle Chasse, La.

[21] Appl. No.: 782,514

[22] Filed: Oct. 1, 1985

[51] Int. Cl.[4] .......................... F16K 3/02; F16K 25/00
[52] U.S. Cl. ..................................... 251/327; 251/328; 137/329.02
[58] Field of Search ............... 251/327, 328, 363, 360, 251/172, 175, 193, 195, 196; 137/329, 329.1, 329.2, 364, 329.01, 329.02, 329.03

[56] References Cited

U.S. PATENT DOCUMENTS

| | | | |
|---|---|---|---|
| 4,095,612 | 6/1978 | Hardcastle | 251/196 X |
| 4,179,099 | 12/1979 | Pierce, Jr. | 251/196 X |
| 4,246,928 | 1/1981 | Burns et al. | 251/196 X |
| 4,434,967 | 3/1984 | Vanderburg | 251/172 X |
| 4,487,393 | 12/1984 | Eagen | 251/195 |
| 4,515,174 | 5/1985 | Hollister et al. | 251/196 |

Primary Examiner—Alan Cohan
Assistant Examiner—John Starsiak, Jr.
Attorney, Agent, or Firm—Norvell & Associates

[57] ABSTRACT

This invention relates to an improved gate valve having floating seal elements which are back-relieving and reversible for long-term permanent sealing under varied pressure conditions. The sealing elements are mounted in unrestrained relation in juxtaposed recesses in the fluid passage facing the movable gate with annular gaskets facing both the gate and the recesses for improved self-aligning sealing engagement therewith. The sealing elements and their annular gaskets may be reversed, interchanged, or readily replaced as desired, the valve structure being especially useful for inherently fail-safe slab type gate valves.

2 Claims, 4 Drawing Figures

GATE VALVE SEAL SYSTEM

BACKGROUND OF THE INVENTION

1. Field of the Invention

The present invention relates to gate valves, and more particularly to self-relieving gate valves which possess floating seal arrangements to insure permanent and durable sealing engagement with the movable gate. The gate valve is of the slab type wherein the gate is operable within a hollow chamber to seal off a communicating fluid passage. The valve utilizes a pair of self-relieving sealing elements which are mounted in self-aligning and unrestrained relation in pockets in the fluid passage facing the gate for limited movement therewithin, and having annular gaskets mounted on the floating seal elements disposed in sealing contact with the gate and the mounting pockets.

2. Description of the Prior Art

Previously, most types of gate valves have utilized sealing elements which are press fit into pockets in the fluid passage adjacent the gate element, the sealing elements having an annular gasket facing both sides of the gate wherein the sealing elements are permanently and rigidly affixed within the pockets. Transverse movement of the gate element on opening and closing the valve frequently results in uneven wear of the gasket members because it is difficult to both initially align and maintain the sealing elements in perfect alignment with the facing surfaces of the gate. Any misalignment results in uneven wear of one or both of the sealing gaskets which ultimately results in leakage of the valve, either at the gate or at the mounting pocket wherein the fixed sealing element is disposed. It is common for the sealing elements to be rigidly attached to the valve body either by a high-pressure force fit or being welded in place for permanent attachment to the body. Such valve constructions are not self-relieving, can result in undue wear and ultimate valve failure at the seals where the gate may be operated virtually thousands of times during its useful working life.

There are various types of valves in existence of the floating seat type; however, most such structures utilize a single floating seat on one side of the gate while the other seat is permanently affixed to the valve body, the single floating seat normally being disposed on the upstream side of the valve.

There are in existence several types of gate valves which utilize floating seats which attempt to completely seal off the juncture between the valve seat pocket and the sealing element facing the gate with various types of elastomeric materials, or where the backside of the seat element is press fit into the valve body. Such valve seats are rigidly attached to the valve seat pocket to prevent leakage from the valve passage around its outside or the outside diameter of the seating element. It has been common practice to place a sealing element between the outside diameter of the sealing element and the internal diameter of the seat pocket, such sealing element normally being placed in the axial passage between the seal element and its receiving pocket. In such structures with the seal at that juncture, the seat element is permitted to float back and forth and remain in sealing contact with the valve seat so that no fluid passage occurs between such members. However, in such structures the problem which is thereby created, primarily associated with reverse acting valves, is that valves which close with their valve stem extending in an upward direction, i.e. typically those used for well head safety equipment as opposed to the direct acting valve which has a closed position with the valve stem facing downwardly, is that upon action of the valve body, pressure within the valve bore acting in concert with the stem, the upper portion of the stem being exposed to atmospheric pressure and the lower portion being located interiorly of the valve body, creates an unbalanced condition. Where the valve body is then internally pressurized with the well head fluids, the unbalanced effect causes the stem to elevate due to upward net forces where the gate has a solid portion in its bottom half. Thus, it will then close the valve. Such valves are commonly termed inherently fail-safe valves, wherein if any undue or unexpected conditions occur within the system, an actuator normally positioned in connection with the stem powers the valve so that when control pressure is relieved from the actuator, pressure within the valve body will cause the valve to close into an inherently fail-safe condition.

Typically, valves having floating seat elements are primarily designed to seal a valve from the upstream side, i.e. the side from which the pressure is exerted. Where the sealing element is completely sealed off within the valve seat pocket and is allowed to float, pressure acting between seating element and the sealing element that seals off the gate creates a differential effect between the outside diameter of the seal element and the valve seat pocket and the lesser diameter seal that seals off the gate. This differential in area with the valve body pressure coming from the upstream direction forces the floating seal element up against the gate, thus creating a seal on the upstream side. Thus, the seal element is forced against the gate and the entire valve cavity is sealed off in addition to the flow line downstream of the valve. However, where you employ a floating seat element in a reverse acting valve, the upstream sealing element causes the valve cavity to lose pressure through the downstream sealing element and where the stem is rising, effecting an elevation of the gate. A volume equal to the gate portion is removed from the valve cavity. Thus, upon displacement of the gate due to the stroke of the stem, a volume is being extracted causing the valve cavity to increase in volume by the same amount. When liquid at high pressure, say 3,000–4,000 psi, the stem is displaced out of the top of the valve, thus increasing the valve cavity volume. Pressure within the valve cavity is decreased very rapidly with an upstream floating seal element that is sealed to the valve seat pocket permanently and as it is allowed to move back and forth, it then seals against the gate. However, in the case of the reverse acting valve, as the gate is elevated to close off the fluid passage and maintain the seal element against the gate, an upper portion of the stroke must be completed since the gate has not been completely elevated to permit a reliable seal. At that point the gate only begins to seal so that it must be stroked further to guarantee that the seal remains in place and is fully reliable. Where the valve cavity is increasing appreciably in volume, as stated, as the gate attempts to rise and the pressure is falling rapidly due to increased expansion of volume in the cavity, very frequently the gate is not elevated to its full uppermost position, thus not fully engaging the valve seat element at the gate to form a reliable seal. In the case of reverse acting valves such gates frequently do not fully close unless an auxiliary closing force is applied to the stem such as by a strong mechanical spring being mounted on top of the valve actuator. Whether the gate operates upwardly or downwardly, reversing the action of the gate and seat element to have the gate move upward to close the valve without the aforesaid problems occurring have continued to be deficiencies in existing floating seat type valves.

SUMMARY OF THE INVENTION

The present invention relates to an improved self-relieving gate valve having floating seat elements facing the gate which are capable of limited unrestrained movement and having annular gaskets capable of continuous sealing engagement with both the gate and the seat mounting pockets for long-term use in inherently fail-safe type gate valves. The floating seal elements comprise tubular elements which are fitted within closely complemental pockets in the fluid passage on opposite sides of the gate. The tubular movable seat elements have annular gaskets on both ends which face both the gate and the sealing pocket for sealing engagement therewith, the primary sealing elements being comprised of either non-elastomeric or elastomeric materials, preferably the former. The seat elements have annular recesses in their ends for receiving the annular gaskets of preferably non-elastomeric material to seal against the movable gate as well as to seal within the juxtaposed surface of the seat pocket. The seat elements have annular grooves at their extremities of maximum outside diameter within which another seal element such as an elastomeric material may be mounted for sealing axially against the base of the seat pocket. The essentially non-elastomeric sealing gaskets on the seat element are primarily for sealing the gate while the elastomeric sealing gasket is primarly to seal the seat element within its pocket. Thus, both floating seat elements are capable of axial movement either in one direction or the other depending upon whether pressure is applied from one side of the gate or the other during opening and closing of the valve. The valve provides an inherently failsafe structure which is self-adjusting and self-aligning, the seat elements and their annular gaskets being readily reversible or replaceable as desired while being capable of long-term reliable use.

An object of the invention is to provide an inherently fully-closing self-aligning gate valve which automatically adjusts to varying pressure conditions on the closure gate and which has readily reversible or replaceable annular sealing gaskets, the valve structure being especially useful in reverse acting valves.

A further object of the invention is to provide a back-pressure relieving gate valve having self-aligning sealing elements which are capable of limited axial movement toward and away from the gate, depending upon pressure conditions, and which facilitates reversability of the sealing elements for their floating axial movement toward and away from the gate during all phases of its opening and closing movement under widely varying pressure conditions.

BRIEF DESCRIPTION OF THE DRAWINGS

Additional objects and advantages of the present invention are set forth hereinbelow with respect to the drawings wherein.

DESCRIPTION OF THE PREFERRED EMBODIMENT

Figure 1:
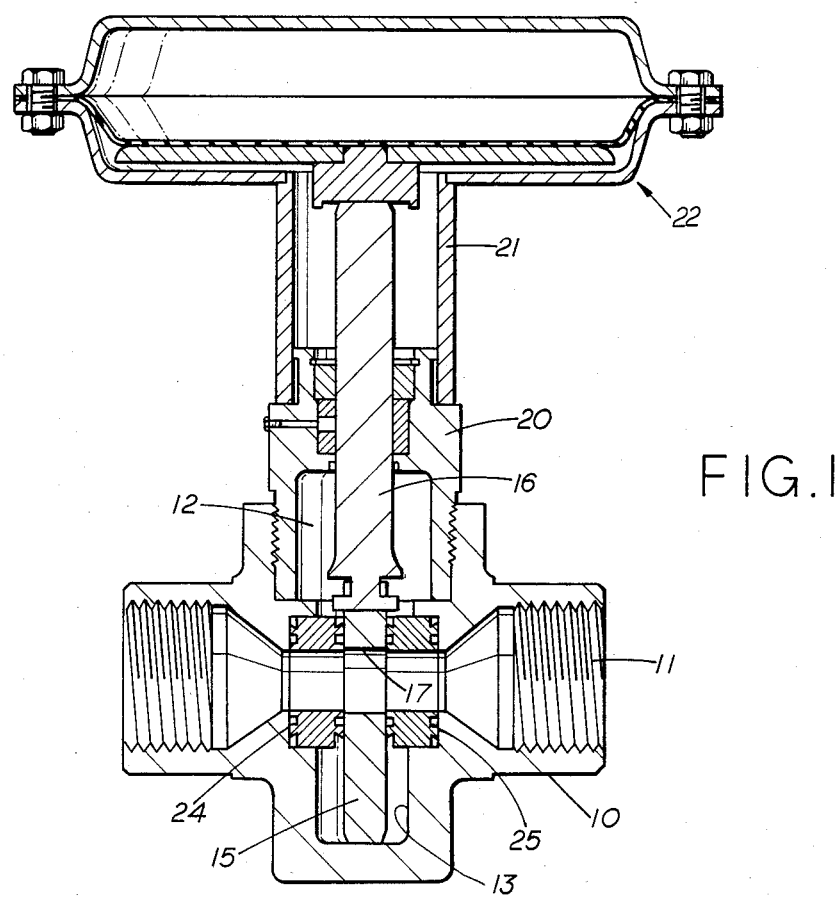
FIG. 1 is a vertical sectional view of the improved gate valve showing its components with the gate in open position.

The improved gate valve of the present invention includes a rigid housing 10, having a flow passage 11 extending therethrough, and a tubular chamber or bore 12 communicating with the flow passage and extending transversely thereto. The bore 12 extends into and through the flow passage terminating within the chamber 13. The chamber intersects the flow passage and surrounds a gate member 15 positioned within the chamber for vertical movement therewithin. The gate 15 is adapted to be vertically movable by an interconnecting stem 16 which projects exteriorly. The gate is capable of being moved such that a central port 17 therein is in registry with the flow passage 11 when the gate is open to a position interrupting flow through the flow passage when the gate is closed. The exterior openings of flow passage 11 may be interiorly threaded at both sides of the body for connecting of the valve to flow lines and the like.

A bonnet member 20 is attached to the body 10 such as by bolts (not shown) and a cap member 21 is normally threadingly attached to the exterior side of the bonnet 20. The stem 16 attached to the gate and extending through the bonnet and projecting exteriorly serves to raise and lower the gate to open and close the flow passage. A pressure actuator designated by the numeral 22 is mounted in contact with stem 16 to actuate the gate as known in the art.

Figure 2:
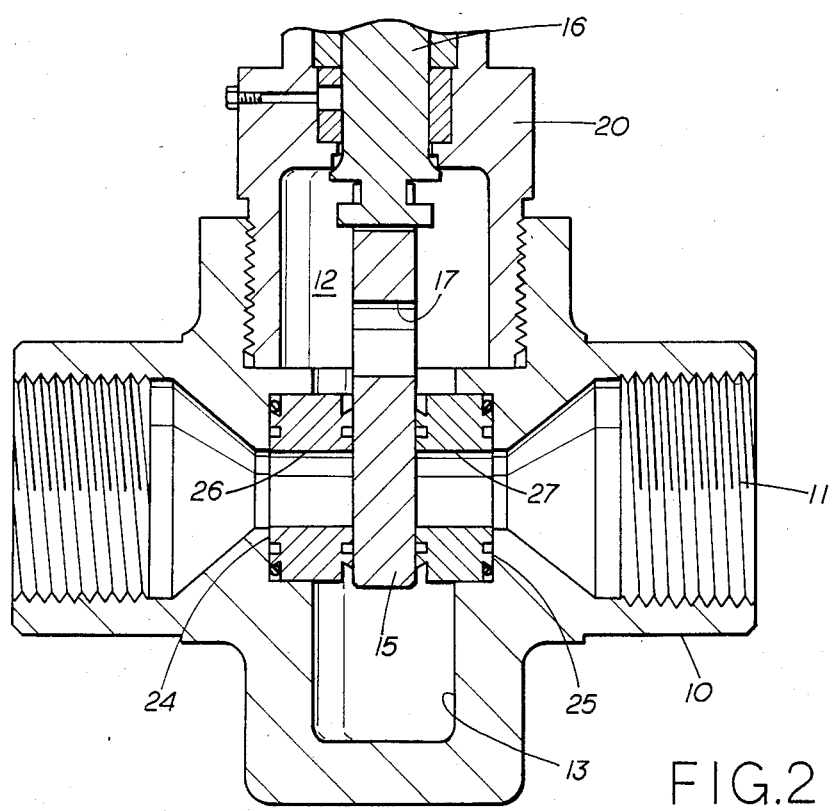
FIG. 2 is an enlarged vertical sectional view of the gate portion of the valve with the gate in closed position.
Figure 3:
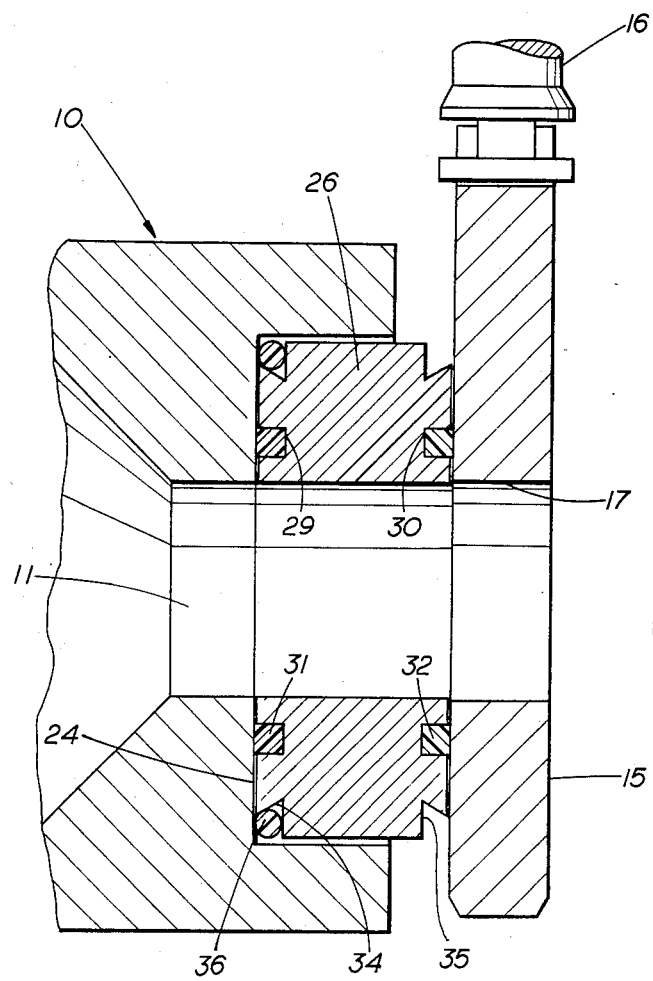
FIG. 3 is a further enlarged sectional view showing the gate on one seating element adjacent the gate in open posi- tion.
Figure 4:
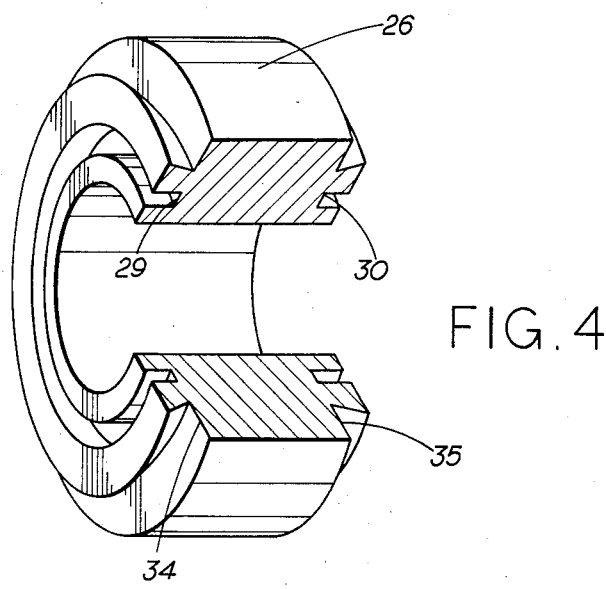
FIG. 4 is a perspective view of one seating element.

As shown in FIGS. 1 and 2, valve seat pockets 24 and 25 which constitute an enlargement in the flow passage 11 are formed within the valve body facing both sides of the gate 15. Seat pocket 24 is located on the left side of the gate 15 and seat pocket 25 is located on the right side as shown. Valve seat pockets 24 and 25 are preferably right cylindrical in shape having similar dimensions substantially greater than the fluid passage. A tubular valve seat member 26 having a complemental dimension is mounted within the valve seat pocket 24 for limited axial movement therewithin. Similarly, a matching valve seat member 27 is mounted within valve seat pocket 25 for similar movement therewithin. Each of the valve seats 26 and 27 has a pair of annular recesses 29 and 30 in their ends as shown more clearly in FIG. 3 adapted to receive a pair of annular sealing gaskets 31 and 32. Gasket 31 faces the seat pocket 24 and gasket 32 faces the gate, both gaskets being capable of sealing engagement therewith. The two recesses 29 and 30 are preferably complementally contoured such as being rectangular in section to receive and restrain the similar annular gaskets 31 and 32, preferably comprised of non-elastomeric material. Seat elements 26 and 27 each have dove-tailed grooves 34 and 35 at their ends closely adjacent their maximum dimension adapted to receive an annular sealing gasket 36 which is preferably fitted within one end of the seat element facing the seat pocket. Gasket 36 is preferably comprised of elastomeric material and seals the base of the seat pocket at a near-maximum dimension.

The seat elements each bearing the three sealing gaskets are mounted in their respective pockets in unrestrained relation so that they may move axially within limits as necessary or required during all phases of gate movement. The two annular sealing gaskets 29 and 30 in the complemental recesses are preferably formed of non-elastomeric material such as Teflon or other material capable of withstanding contained fluids such as crude oil and other petroleum based products. Annular gasket 36 is preferably comprised of elastomeric material such as synthetic rubber capable of sealing the annular space between the seat element and the seat pocket immediately beyond the inner sealing gasket. Thus, both sides of the gate are faced with floating or freely movable seat members which are sealed against fluid flow on both sides facing the gate and seat pocket respectively. The seat members are free to move a limited axial distance while maintaining their sealing gaskets in sealing contact with the facing surfaces. The seat elements and their gaskets may be readily reversed or replaced as required for further use.

Normally floating seat elements exhibit a tendency to seal the valve from the upstream side, i.e. the side from which pressure is exerted. However, in the present structure wherein the individual seating element, which is completely sealed within the valve seat pocket, is allowed to float, then pressure acting between the seating mechanism and the sealing mechanism that normally seals off the gate, exerts a positive action on the movable gate throughout all intervals of its complete movement. There is a differential effect between the outside diameter of the seal element and the valve seat pocket and the smaller diameter seal which seals off the gate. This differential in area with the valve body pressure being exerted from the upstream side forces the sealing element on that side up against the gate, thus creating a seal on the upstream side.

In that situation where the seal element is forced against the gate, on the upstream side the valve has essentially sealed off the entire valve cavity in addition to the flow line downstream of the valve. Where a floating seat element is employed in a reverse acting valve, the upstream sealing element causes the valve cavity to lose pressure which is either relieved to the downstream side or through the downstream sealing element as the gate is moved upwardly through the valve body. Upon such upward movement of the gate, the valve cavity is enlarged in volume causing pressure within such cavity to decrease by the extraction of the stem and gate volume. When expansion of the fluids within the cavity occurs, upon displacement of the gate upwardly in the valve, pressure within the valve cavity is decreased very rapidly. Having the upstream sealing element comprising a floating seat that is sealed to the valve seat pocket permanently as it is allowed to move back and forth, it then serves to seal off the gate. In a reverse acting valve the gate moves upwardly closing off the fluid passage and the facing seal element is moved against the gate and maintained thereagainst.

The annular gasket 36 normally comprised of elastomeric material in the dove-tailed groove of the seal element adjacent its outermost diameter seals against the seat pocket while the annular gaskets 31 and 32 of lesser diameter seal against the gate. The sealing gasket which is in the pocket or recess facing the seat pocket, which is preferably identical to the one opposing the gate, seals off the seat pocket while the larger seal element also seals the seat element within the seat pocket, therefore always maintaining pressure within the flow passage. The floating seat is provided with sufficient allowance to adjust itself into self-aligning relation to be certain that the sealing element or annular gasket is flat against the gate, thus always assuring self alignment. Where the seat is permitted to freely float, the sealing gasket will inherently align itself with the facing surface of the gate, and thus assure a reliable seal.

In the case of the downstream seating element, the gate forces itself against the downstream sealing element and thereby against the smaller non-elastomeric sealing gasket which then forces the seat element to move in its pocket wherein it bottoms out compressing the elastomeric seal ring in addition to the non-elastomeric seal ring against the valve seat pocket. Thus, both upstream and downstream sides of the sealing gate are capable of effecting long-term permanent liquid-tight sealing of the valve. In the floating seat arrangement of the present invention, both seating elements on opposite sides of the gate are capable of axial movement within the flow passage to insure durable sealing against the gate. Annular gaskets 31, 32 and 36 may be interchanged as desired and also the seat elements 26 and 27 may be reversed, placing sealing gasket 36 within the larger dimension of the seat pocket. With the seat elements of the subject valve being reversible, the life of the valve sealing elements may be doubled in some cases by simply disassembling the valve, reversing the seal elements, and/or replacing the sealing elements as required prior to reassembling the valve for further use. Where excessive wear may occur on the downstream side sealing element, the upstream side will normally experience very little wear, permitting interchangeability of the sealing elements. In some cases it is possible to obtain quadrupling of the life of the sealing elements by such reversible construction. In the present valve construction both upstream and downstream sides of the valve are equally leak resistant and capable of long-term use regardless of whether the flow is maintained from one direction of the valve or the other or the flow direction reversed, simply by interchanging the seat elements or their annular sealing gaskets.

In some embodiments of the invention it is possible to eliminate annular gasket 36 in order to provide floating seat elements having completely non-elastomeric sealing gaskets within the valve body. The sealing elements remain floating within the valve seat cavities. The larger elastomeric gasket within the larger region of the seat pocket is primarly intended to extend valve life providing a second seal within the seat pocket for valves which must withstand repeated opening and closing over the working life of the valve. As is well known, some fluids such as petroleum oils attack elastomers, wherein the non-elastomeric sealing elements are capable of much longer life than the former in such use.

Various modifications may be resorted to within the spirit and scope of the appended claims.

What is claimed and desired to be secured by Letters Patent is:

1. A gate valve having reversible sealing elements comprising a body having a central chamber opening to the exterior of the body and a cylindrical fluid passage extending through the body and having opposed openings communicating with said chamber, a cylindrical counter bore in each of said opposed openings; each said counter bore having a radial base; a gate member movable within said chamber intermediate said opposed openings to open and close flow through said fluid passage; a pair of annular floating valve seat members respectively disposed within said counter bores on opposite side of said gate member for limited axial movement therein; each said valve seat member having a first face adjacent said gate member and a second face adjacent the said base of the respective counter bore; first and second identical annular seal means coaxially mounted on said faces of said annular valve seat members for respectively contacting said gate member and said counter bore base and maintaining sealing engagement therewith during all phases of gate movement; an annular recess formed in each said face of each said annular valve seat member adjacent the periphery thereof; and a third annular sealing means removably mounted in the annular recess disposed in said second face to sealingly engage the base of the respective counter bore, whereby each of said annular valve seat members may be reversed in its respective counter bore by shifting said third annular sealing means to said annular recess in said first face of said annular valve seat member and positioning that first face adjacent said radial base of the respective counter bore.

2. The gate valve of claim 1 wherein said first and second annular seal means are formed of a non-elastomeric sealing material, and said third annular seal means is formed of an elastomeric material.

* * * * *